US012037983B2

(12) United States Patent
Rask

(10) Patent No.: US 12,037,983 B2
(45) Date of Patent: Jul. 16, 2024

(54) LOCKING SYSTEM FOR A ROTATABLE MOUNTED UNIT OF A WIND TURBINE, WIND TURBINE AND METHOD FOR OPERATING A LOCKING SYSTEM

(71) Applicant: Siemens Gamesa Renewable Energy A/S, Brande (DK)

(72) Inventor: Leif Christian Rask, Lem St (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 17/779,159

(22) PCT Filed: Oct. 23, 2020

(86) PCT No.: PCT/EP2020/079848
§ 371 (c)(1),
(2) Date: May 24, 2022

(87) PCT Pub. No.: WO2021/115672
PCT Pub. Date: Jun. 17, 2021

(65) Prior Publication Data
US 2022/0412311 A1    Dec. 29, 2022

(30) Foreign Application Priority Data

Dec. 10, 2019 (EP) .................................... 19214874

(51) Int. Cl.
*F03D 7/02* (2006.01)
*F03D 80/30* (2016.01)
(52) U.S. Cl.
CPC ........... *F03D 7/0268* (2013.01); *F03D 80/30* (2016.05); *F05B 2260/31* (2020.08)
(58) Field of Classification Search
CPC ...... F03D 7/0264; F03D 7/0268; F03D 80/00; F03D 80/30; F03D 80/50; F05B 2260/30;
(Continued)

(56) References Cited

U.S. PATENT DOCUMENTS

2007/0187954 A1* 8/2007 Struve ................... F03D 7/0244
290/44
2009/0162202 A1* 6/2009 Nies ....................... F03D 7/0264
416/169 R
(Continued)

FOREIGN PATENT DOCUMENTS

CN       108388158 A  *  8/2018
CN       109139391 A  *  1/2019 ........... F03D 7/0244
(Continued)

OTHER PUBLICATIONS

International Search Report & Written Opinion for PCT/EP2020/079848 issued Feb. 17, 2021.

*Primary Examiner* — John M Zaleskas
(74) *Attorney, Agent, or Firm* — Schmeiser, Olsen & Watts LLP

(57) ABSTRACT

A locking system for a rotatable mounted unit of a wind turbine is provided, including at least one lock adapted to lock and unlock the rotatable mounted unit, wherein the locking system includes first and second devices to prevent rotation, wherein the lock is prevented from changing from the locked state if at least one of the devices to prevent rotation is in a secure state, wherein a control unit is adapted to generate a control command changing the first device to prevent rotation into the secure state if the lock currently locks the rotatable mounted unit, wherein the locking system automatically changes the second device to prevent rotation into the secure state if an access condition is fulfilled, wherein the access condition is fulfilled if a recorded access information indicates that a room with the rotatable mounted unit is currently accessed or going to be accessed.

14 Claims, 2 Drawing Sheets

Figure 1:
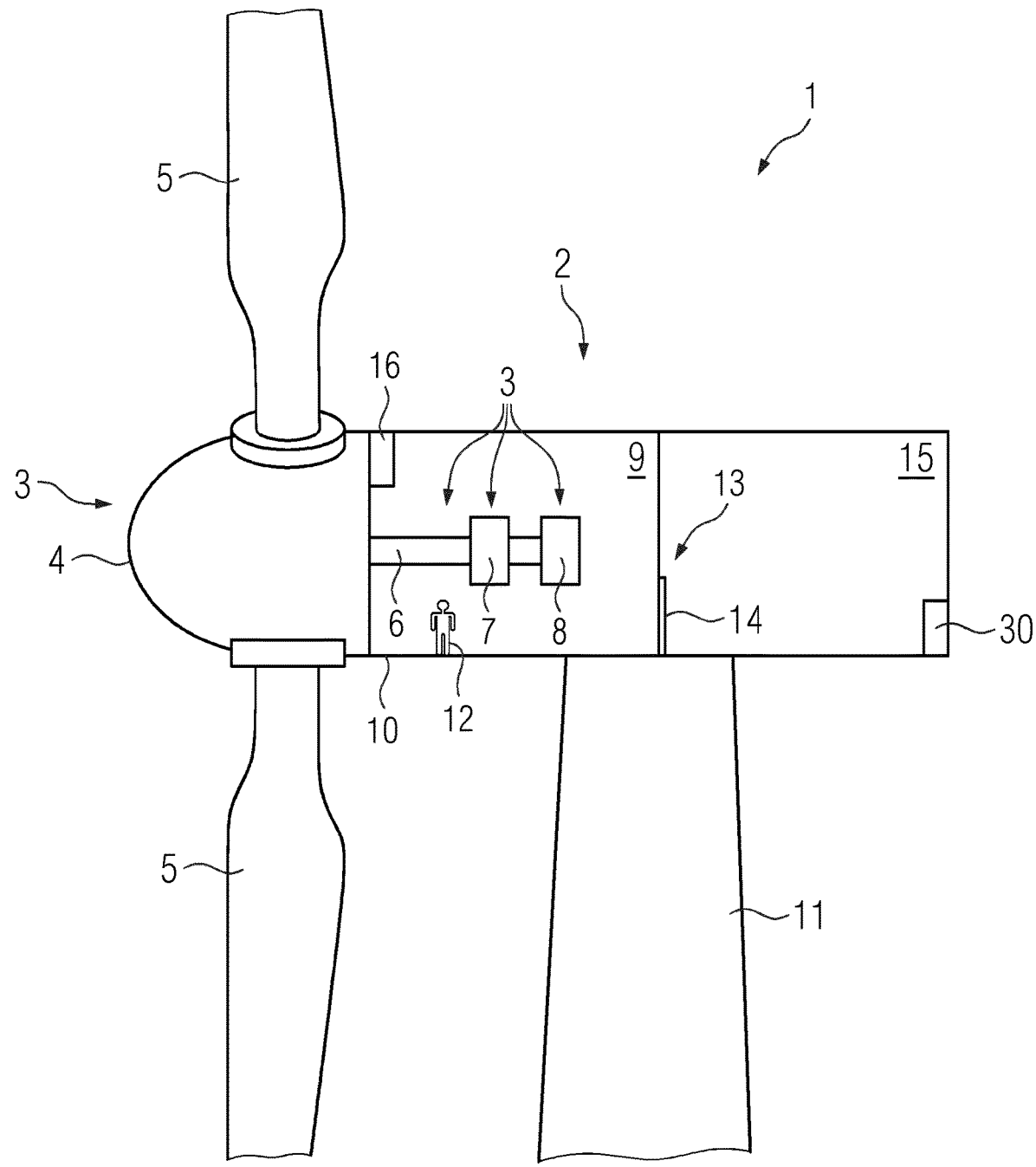

(58) Field of Classification Search
CPC ........ F05B 2260/31; F16P 3/08; Y02E 10/72; Y02E 10/728
See application file for complete search history.

(56) References Cited

U.S. PATENT DOCUMENTS

| | | | | |
|---|---|---|---|---|
| 2010/0013227 A1* | 1/2010 | Weitkamp | ............ | F03D 7/0264 290/44 |
| 2010/0021299 A1* | 1/2010 | Aarhus | ............... | F03D 80/50 416/31 |
| 2010/0183440 A1* | 7/2010 | Von Mutius | ........... | F03D 17/00 416/37 |
| 2010/0194114 A1* | 8/2010 | Pechlivanoglou | .... | F03D 7/0248 290/55 |
| 2010/0232978 A1* | 9/2010 | Nielsen | ................. | F03D 80/50 416/248 |
| 2010/0247311 A1* | 9/2010 | Schlangen | ............ | F03D 80/00 416/61 |
| 2011/0123339 A1* | 5/2011 | Eriksen | ................ | F03D 7/0248 416/169 R |
| 2011/0204631 A1* | 8/2011 | Minami | ................. | H02J 3/381 290/44 |
| 2011/0316278 A1* | 12/2011 | Siegfriedsen | .......... | F03D 80/00 290/55 |
| 2012/0070304 A1* | 3/2012 | Nielsen | ................ | F03D 80/50 416/244 R |
| 2013/0264167 A1* | 10/2013 | Geiken | ............... | F03D 1/06 192/135 |
| 2013/0302175 A1* | 11/2013 | Munk-Hansen | ........ | F03D 80/80 416/245 R |
| 2014/0010651 A1* | 1/2014 | Nies | ........................ | F03D 80/00 416/244 R |
| 2014/0010656 A1* | 1/2014 | Nies | ........................ | F03D 7/0244 29/889 |
| 2015/0219073 A1* | 8/2015 | Baumgaertel | ........... | F03D 7/024 416/1 |
| 2018/0224063 A1* | 8/2018 | Geiken | ................. | H01H 27/06 |
| 2019/0048851 A1* | 2/2019 | Hoffmann | ............... | F03D 80/50 |
| 2019/0072069 A1* | 3/2019 | Rask | ..................... | F03D 7/0244 |
| 2019/0113024 A1* | 4/2019 | Smith | ..................... | F03D 7/047 |
| 2019/0219034 A1* | 7/2019 | Markussen | ........... | F03D 7/0268 |
| 2019/0277254 A1* | 9/2019 | Larsen | ................. | F03D 7/0264 |
| 2020/0263663 A1* | 8/2020 | Adrian Schmidt | ... | F03D 7/0264 |
| 2020/0332772 A1* | 10/2020 | Therkildsen | ........... | F03D 80/50 |
| 2021/0108620 A1* | 4/2021 | Levin | ...................... | F03D 80/70 |
| 2021/0180564 A1* | 6/2021 | Andersen | ............... | F03D 7/0244 |
| 2021/0285422 A1* | 9/2021 | Liingaard | .............. | F03D 15/00 |
| 2021/0396210 A1* | 12/2021 | Otten | ................... | F03D 7/0268 |
| 2022/0025852 A1* | 1/2022 | Wegmann | ............... | F03D 7/047 |

FOREIGN PATENT DOCUMENTS

| | | | | |
|---|---|---|---|---|
| EP | 2 905 467 A1 | 8/2015 | | |
| EP | 2905467 A1 * | 8/2015 | ........... | F03D 7/0244 |
| KR | 101499158 B1 * | 3/2015 | ........... | F03D 7/0244 |
| KR | 101499159 B1 * | 3/2015 | | |
| WO | 2010/102 967 A2 | 9/2010 | | |
| WO | WO-2012000516 A2 * | 1/2012 | ............. | F03D 1/003 |
| WO | 2012/059 516 A2 | 5/2012 | | |

* cited by examiner

LOCKING SYSTEM FOR A ROTATABLE MOUNTED UNIT OF A WIND TURBINE, WIND TURBINE AND METHOD FOR OPERATING A LOCKING SYSTEM

CROSS-REFERENCE TO RELATED APPLICATIONS

This application claims priority to PCT Application No. PCT/EP2020/079848, having a filing date of Oct. 23, 2020, which claims priority to EP Application No. 19214874.0, having a filing date of Dec. 10, 2019, the entire contents both of which are hereby incorporated by reference.

FIELD OF TECHNOLOGY

The following relates to a locking system for a rotatable mounted unit of a wind turbine, comprising at least one locking means or lock adapted to lock and unlock the rotatable mounted unit.

BACKGROUND

Typically, wind turbines comprise a tower and a nacelle located on top of the tower, wherein the nacelle houses several components which convert the rotational energy of a rotating hub into electrical energy. To transfer this energy, a hub with several blades is connected with the generator by a main shaft and a bearing system.

Sometimes it is necessary to perform maintenance of rotating components of the wind turbine like the hub, the main shaft, the bearing system, or the rotor. In this case, a technician has to work in the vicinity or even inside the respective rotating parts of the wind turbine. In this situation, it is important to prevent the rotatable mounted unit of the wind turbine from rotating, because otherwise the technician is in danger. To avoid such situations, locking systems to prevent the rotatable mounted unit from rotating are provided.

WO 2012/059 516 A2 discloses such a locking system for a rotatable mounted unit of a wind turbine with a hydraulic system adapted to drive cylinders to lock and unlock a rotatable part of the wind turbine. Once the cylinders have locked the rotatable mounted unit, valves are activated to change a door leading into a section of the wind turbine with the rotatable mounted unit from a locked state into an unlocked state. To unlock the rotatable mounted unit again, the door has to be closed.

Another system for locking a hub of a wind turbine is disclosed in WO 2010/102 967 A2. To lock the hub, pins are moved into respective openings to block a rotational movement of the hub. The openings are located on a flange of the hub and the pins are mounted on a base frame of a nacelle of the wind turbine. Means for fixing the pins in the locking position are provided.

SUMMARY

An aspect relates to an enhanced concept to lock a rotatable mounted unit of a wind turbine, in particular with respect to enable a safe and secure maintenance work in the vicinity of the rotatable mounted unit of the wind turbine.

To solve this problem, a locking system as stated above comprises a first prevention means and a second prevention means, wherein the locking means is prevented from changing from the locked state into the unlocked state if at least one of the prevention means is in a secure state, wherein a control unit is adapted to generate a control command changing the first prevention means into the secure state if the locking means currently locks the rotatable mounted unit, wherein the locking system is adapted to automatically change the second prevention means into the secure state if an access condition is fulfilled, wherein the access condition is fulfilled if a recorded access information indicates that a room with the rotatable mounted unit is currently accessed or is going to be accessed via an entrance means.

Once the rotatable mounted unit is locked by the locking means, the first prevention means is automatically changed into the secure state. To initiate the change of the locking means from the unlocked or retracted state, where the rotation of the rotatable mounted unit is possible, to the locked state, where the rotation of the rotatable mounted unit is not possible, and/or vice versa, the control unit can be adapted to generate a respective locking and/or unlocking command. This command can be triggered by a user via a control device or provided remotely.

After the locking means has reached the locked state, the first prevention means change into the secure state preventing the locking means to change back into the unlocked state unintentionally. This aspect represents a first protection layer of the locking system according to embodiments of the present invention.

In particular to allow for the change of the locking means from the locked state into the unlocked state, the first prevention means can be adapted or controlled to leave the secure state. The first prevention means can be brought out of the secure state manually, e.g., by activating or switching the first prevention means by hand. Additionally, or alternatively, a control command causing the first prevention means to leave the secure state can be generated, in particular by the control unit. The respective control command can be generated if a first prevention means leaving condition is fulfilled. Exemplarily, the first prevention means leaving condition is fulfilled or can only be fulfilled if a respective control signal, e.g., generated by staff or automatically, is present or if the access condition is not fulfilled any more.

The locking system furthermore comprises a second protection layer to furthermore prevent the locking means to leave the unlocked state, wherein the second level basically acts independently from the first prevention level. If the first prevention means or the second prevention means or both are into the secure state, the locking means cannot change from the locked into the unlocked state.

The principle of the second protection layer is based on the idea that second prevention means are changed into the secure state depending on the access condition. The access condition can be fulfilled if a room or section of the wind turbine with the rotatable mounted unit is accessed, e.g., by the technician. Additionally, or alternatively, the access condition can be fulfilled, if an access of the room with the rotatable mounted unit is imminent.

Having the second prevention means into the secure state reliably prevents the locking means from changing from the locked state into the unlocked state if the access condition is fulfilled, e.g., if maintenance staff is currently working in the vicinity or the inside of the rotatable mounted unit. Even if the first prevention means accidentally leaves the secure state, the second prevention means ensures that the rotatable mounted unit remains in the locked state.

In particular, to allow the locking means to change from the locked state into the unlocked state, the second prevention means can be adapted or controlled to leave the secure state. The second prevention means can be brought out of the secure state manually, e.g., by activating or switching the second prevention means by hand. Additionally, or alternatively, a control command causing the second prevention means to leave the secure state can be generated, in particular by the control unit. The respective control command can be generated if a respective control signal, e.g., generated by staff or automatically, is present or if the access condition is not fulfilled any more.

In an embodiment, the first and/or the second prevention means are switches adapted to disconnect the power supply of at least one actuator of the locking means. After the locking means have changed into the locked state, the switches cut off the actuator from the power supply. The actuator is only connected with the power supply if the switches of both prevention means are not in the secure state. For this, the switches can be connected in series.

The at least one actuator can be a valve or of a hydraulic drive of the locking means. To change the locking means from the locked state into the unlocked state or vice versa, the flow direction of the valve can be changed electrically. The at least one actuator can be an electric motor, wherein the electric motor is adapted to change the locking means from the locked state into the unlocked state or vice versa.

In an embodiment of the invention, at least one key station for storing a key to lock and unlock at least one entrance means for the room is provided, wherein the access information depends on whether the key is currently stored in or at the key station, wherein the access condition is fulfilled if the key is removed from the key station. In other words, the access information says whether the key is currently present at the key station or not, wherein the access condition is fulfilled, if the access information says that the key is currently not present at the key station. The key station can be a key holder with a box to deposit the key. The key can be a classic key to lock and unlock the entrance means. The key can also be a key card or a security token, in particular with an RFID-transponder. If several entrance means are provided, one key can be provided to lock and unlock all of the entrance means. Alternatively, several keys can be provided, wherein each key can lock and unlock at least to or all of the entrance means. In an embodiment, the number of keys equals the number of entrance means, wherein each key is assigned to a certain entrance means.

Once the key has been removed from the key station, the access condition is fulfilled and, hence, the second prevention means changes into the secure state. Removing the key from the key station indicates that e.g., the technician intends to enter the respective room of the wind turbine with the rotatable mounted unit. In an embodiment, the removal of the key itself activates the switch of the second prevention means. This can be compared to the principle of many hotel rooms, where the removal of the key card automatically turns off the light in the hotel room.

The key station can comprise a key receiver adapted to hold or carry the key when the key is stored in or at the key station, especially for opening the switch. In this embodiment, the key can comfortably be deposited in or at the key station. Particularly, the key being in the key receiver opens the switch of the second prevention means.

The key receiver can be a holding means like a hook or a lug or the like. In an embodiment, the key receiver is or comprises a key hole where the key is to be inserted for storage, wherein, for storing the key, the key is inserted into the key hole and turned and, for removing the key, the key is turned back before it can be pulled out, wherein turning the key back before removing the key changes the second prevention means into the secure state or leaves the second prevention means in the secure state. In particular, the key is to be inserted in the keyhole for storage and for activating the second prevention means. For removing the key, it can be turned, e.g., around an angle of 90° from a vertical into a horizontal position of the key head and be pulled out. The key is not removable from the key station, i.e., it cannot be pulled out from the keyhole, while it is in the vertical position. Turning the key into the horizontal position can automatically change the second prevention means into the secure state. For storing the key, it can be plugged into the keyhole and turned back into the vertical position. Turning the key into the vertical position can automatically cause the second prevention means to leave the secure state.

A further control unit can be adapted to generate a control command changing the second prevention means into the secure state if the key is removed from the key station. The removing of the key can be recorded by a sensor which is connected with the further control unit. Alternatively, the key station can be coupled with the second prevention means by a coupling mechanism adapted to change the second prevention means into the secure state when the key is removed from the key station. The coupling mechanism can comprise a system of rag wheels or the like wherein in particular the turning of the key can change the current state of the second prevention means.

The key station can be a primary box which is connected with the second prevention means. Furthermore, the entrance means can comprise and/or can be dedicated to a key box to lock and unlock the respective entrance means. The key box can be a secondary box which is located close to or on the entrance means or, in particular, entrance door. The key box can comprise a key receiver which can be, like the key receiver of the key station, a slot or hole for the key.

Optionally, at least two key stations, each storing a key, can be provided, wherein the locking system can be adapted to automatically change the second prevention means into the secure state if the key from at least one of the key stations is removed. In an embodiment, the number of key stations equals the number of entrance means. Assuming that all keys are stored at their respective key stations, the second prevention means is automatically changed into the secure state if at least one of the keys is removed from the key station. After this, other keys can be removed from the key station, wherein the second prevention means remain into the secure state. The second prevention means leaves the secure state if the last missing key is stored in its respective key station.

In an embodiment of the invention, the control unit or a further control unit can be adapted to generate a control command changing the at least one key station into a state generally allowing the removal of the key from the key station, if the locking means currently locks the rotatable mounted unit. In this embodiment, a key which is stored in the key station is prevented from being removed if the rotatable mounted unit is not locked by the locking means. In particular, this can be realized by preventing the key from being turned or from being pulled out of the keyhole. A signal light can be provided on the key station to show whether it is currently into the state generally allowing the removal of the key from the key station. If this is the case, the signal light can be green and otherwise red.

In an embodiment, the control unit is adapted to generate a control command allowing the first prevention means to leave the secure state only if the at least one entrance means is closed. In particular, the control unit is adapted to generate the respective control command if all entrance means are closed. The expression "closed" particularly means that the respective entrance means is closed and locked. The control unit can be connected with a door sensor adapted to detect whether the entrance means is closed. This ensures that, in particular if the second prevention means are working incorrectly, the first prevention means remains in the secure state if not all access entrance means are closed.

Additionally, or alternatively, the control unit is adapted to generate a control command allowing the first prevention means to leave the secure state only if the access condition is fulfilled, in particular if the or all of the key stations store their respective keys. In this embodiment, the first and the second prevention means can leave the secure state only if the access condition is fulfilled.

In an embodiment of the invention, at least one pad-lock can be provided, wherein the pad-lock can be attached to the at least one entrance means to mark and/or prevent the entrance means from being closed. Assuming several technicians are currently present at or in the wind turbine, each technician can have one respective pad-lock. If at least one of the technicians enters the room with the rotatable mounted unit, he has to attach the pad-lock to the respective entrance means. On the one hand, the presence of the pad-lock on the entrance means visually indicates that somebody is currently inside the room. On the other hand, the pad-lock can prevent the entrance means from being closed. The pad-lock can physically block the respective entrance means from latching into the respective door or hatch lock. In an embodiment, each technician has a pad-lock key which only matches his respective pad-lock. Hence, the pad-lock cannot be removed from the entrance means before the respective technician has left the room with the rotatable mounted unit.

In an embodiment of the invention, at least one pin or latch of the locking means engages into at least one recess or a hole of the rotatable mounted unit for locking the rotatable mounted unit. The rotatable mounted unit can comprise a flange with several holes, wherein the pins are mounted at a non-rotating part of the wind turbine. For locking and unlocking the rotatable mounted unit, the pins can be moved along their longitudinal pin axes into the radial direction with respect to the rotation axis of the rotatable mounted unit. The control unit can be connected with at least one sensor to detect the current state of the locking means. In particular, one sensor is provided to sense if the locking means is in the unlocked state. To avoid wrong detections indicating erroneously that the locking means is in the locked state, two further sensors can be provided to detect the locked state. Based on this information, the control command to change the first prevention means into the secure state can be generated. One or more other braking systems or brakes to lock the rotatable mounted unit can be provided.

In an embodiment, the key is exemplarily a key card. The key receivers of the key station and the key box are slots for the key card. Removing the key card from the slot of the key station opens the switch of the second prevention means. Inserting the key card into the slot of the key station closes the switch of the second prevention means. Inserting the key card into the slit of the key box allows it to open or automatically opens the entrance means. In an embodiment, the key is non-removably or, in other words, fixedly attached to the key box while the entrance means is open. The key can only be removed from the key box if the entrance means is closed.

Since each of the technicians has his own pad-lock and every technician who enters the room with the rotatable mounted unit attaches his pad-lock to the entrance means, the door is prevented from being closed and, hence, the key can only be removed from the key box until all people have removing their pad-locks from the entrance means after they have left the room.

Furthermore, embodiments of the present invention relate to a wind turbine comprising at least one entrance means leading to a room with the rotatable mounted unit and a locking system as described above. The wind turbine can comprise one or several rooms with rotatable mounted units, wherein each of the rooms can be accessed by one or several entrance means. The entrance means can be a door or a hatch or the like leading into the room with the rotatable mounted unit.

In addition, embodiments of the present invention relate to a method for operating a locking system for a rotatable mounted unit of a wind turbine, comprising at least one locking means adapted to lock and unlock the rotatable mounted unit, wherein a first prevention means and a second prevention means are used, wherein the locking means is prevented from changing from the locked state into the unlocked state if at least one of the prevention means is in a secure state, wherein the first prevention means is changed into the secure state if the locking means currently locks the rotatable mounted unit, wherein the second prevention means automatically changes into the secure state if an access condition is fulfilled, wherein the access condition is fulfilled if a recorded access information indicates that a room with a rotatable mounted unit is currently accessed or going to be accessed via an entrance means.

In particular to allow for a change of the locking means from the locked state into the unlocked state, the first prevention means and/or the second prevention means can leave the secure state. The first prevention means and/or the second prevention means can be brought out of the secure state manually, e.g., by activating or switching the second prevention means by hand.

All features of the locking system according to embodiments of the present invention and the respective advantages also apply to the wind turbine and the method according to embodiments of the present invention and vice versa.

BRIEF DESCRIPTION

Figure 2:
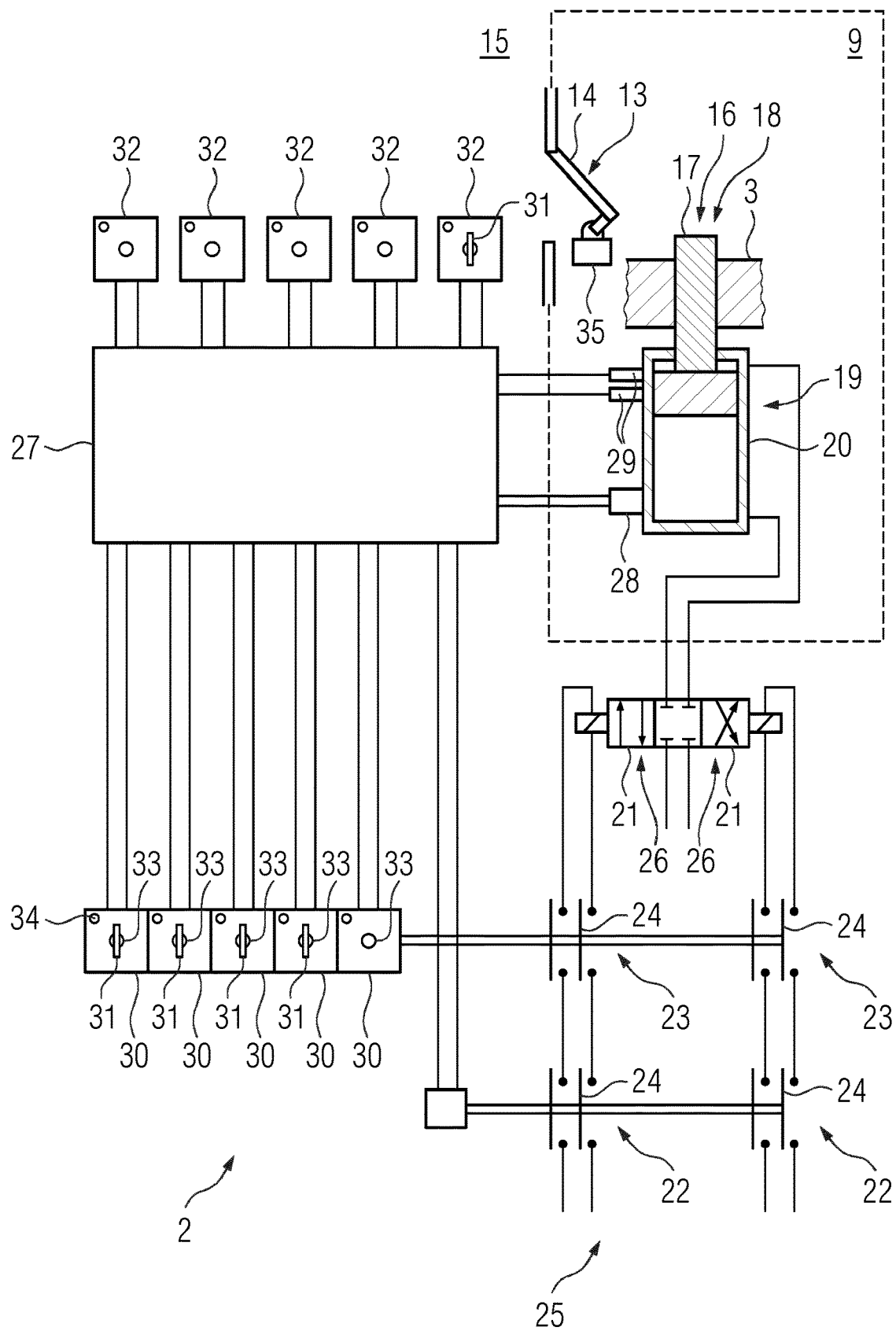

Some of the embodiments will be described in detail, with reference to the following figures, wherein like designations denote like members, wherein:

FIG. 1 An embodiment of a wind turbine; and
FIG. 2 a locking system of the wind turbine of FIG. 1.

DETAILED DESCRIPTION

FIG. 1 depicts a wind turbine 1 with a locking system 2, wherein details of the locking system 2 are shown in FIG. 2. The wind turbine 1 comprises several rotatable mounted units 3, namely a hub 4 with blades 5 and a main shaft 6 which connects the hub 4 with a generator 8 via a bearing system 7 to convert the rotational energy of the hub 4 into electrical energy. The main shaft 6, the bearing system 7 and the generator 8 are located within a room 9 of a nacelle 10, which is located on top of a tower 11 of the wind turbine 1.

The room 9 with the rotatable mounted units 3 can be accessed, e.g., by a technician 12 to perform maintenance work on the rotatable mounted units 3, via an entrance means or entrance 13, namely a door 14 leading from a section 15 of the nacelle 10 without a rotatable mounted units 3 into the room 9. The entrance means 13 can also be a hatch or the like.

If maintenance work has to be performed on or in the vicinity of the rotatable mounted units 3, i.e., within the room 9, the rotatable mounted units 3 have to be locked. Otherwise, the technician 12 could be in serious danger if the rotatable mounted units 3 start to rotate unexpectedly. Hence, a locking means or lock 16 is provided to lock and unlock the rotatable mounted units 3, in particular the hub 4. The locking means 16 comprises a pin 17 which engages into a rotating part of the wind turbine 1, in particular into a hole 18 of the hub 4 or a flange of the hub 4 in a locked state. To change the locking means 16 from the locked state, where it locks the rotatable mounted unit 3, into an unlocked state, where it does not lock the rotatable mounted unit 3, the pin 17 can be moved along its longitudinal pin axis out of the hole 18 via a hydraulic drive 19 which comprises a cylinder 20 and valves 21. Alternatively, the locking means 16 can be driven by an electric motor (not shown).

The locking system 2 comprises a first prevention means or first device to prevent rotation 22 and a second prevention means or second device to prevent rotation 23. The prevention means 22, 23 are electrical switches 24 to connect and disconnect the power supply 25 of actuators 26 of the locking means 16, i.e., of the valves 21. If one of the prevention means or devices 22, 23 is in a secure state, the respective switch 24 is open and the power supply 25 of the actuator 26 is interrupted. As a consequence, the locking means 16 cannot change its current state, in particular it cannot change from the locked state into the unlocked state.

A control unit 27 is adapted to generate a control command changing the first prevention means 22 into the secure state if the locking means 16 currently locks the rotating part, in particular the hub 4. As a consequence, the locking means 16 is prevented from changing into the unlocked state unintentionally. As a result, a first protection layer is realized preventing the rotatable mounted unit 3 from rotating while maintenance work is performed in the room 9. To sense the current state of the pin 17, the control unit 27 is connected with sensors 28, 29. The sensor 28 is used to sense if the locking means 16 is in the unlocked state. To avoid wrong detections indicating erroneously that the locking means 16 is in the locked state, two sensors 29 are used to detect this state. To allow the first prevention means 22 to leave the secure state, the control unit 27 is adapted to generate a respective control command.

To realize a second protection layer preventing the rotatable mounted unit 3 from rotating, the locking system 2 is adapted to automatically change the second prevention means 23 into the secure state if an access condition is fulfilled. The access condition is fulfilled, if an access information indicates that the room 9 is currently accessed or going to be accessed via the entrance means 13. Hence, even if the first prevention means 22 leaves the secure state erroneously, the open switches 24 of the second prevention means 23 prevent the locking means 16 to change into the unlocked state.

For instance, five key stations 30 are provided for storing a key 31 each. Alternatively, the locking system 2 can comprise only one key station 30 adapted to store several keys 31. The keys 31 are adapted to lock and unlock the door 14 and/or other entrance means 13 leading into the room 9. Although the keys 31 are classic keys, the keys can also be key cards, security tokens, in particular with an RFID-transponder, or the like. The access information is fulfilled if at least one of the keys 31 is removed from its respective key station 30.

Each entrance means 13 comprises and/or is dedicated to one of five key boxes 32 to lock and unlock a dedicated entrance means 13. In FIG. 2, the key 31 of one key station 30 has been removed. As a consequence, also the second prevention means 23 has been changed into the secure state. The respective key 31 has been used at the key box 32 to unlock the door 14, which is the entrance means 13 which is dedicated to the key box 32.

It is only possible to unlock the door 14 and, hence, to get access into the room 9 after the respective key 31 has been removed from the key station 30 and inserted in the key box 32. The second protection layer is based on the idea that this removing of the key 31 from the key station 30 causes the change of the second prevention means 23 into the secure state. As a consequence, it is not possible to get access into the room 9 while the second prevention means 23 is not in the secure state and, thus, while the rotatable mounted units 3 are not locked.

In other words, the only possibility to get access into the room 9, namely by removing the key 31 from the key station 30, causes an automatic change of the second prevention means 23 into the secure state. Furthermore, it is only possible to leave the second prevention means 23 from the secure state, after the key 31 is back again at its key station 30, which is only possible after the door 14 has been locked again.

Next, the key stations 30 will be described in more detail. Each of the key stations 30 comprises a key receiver 33, namely a keyhole. To store the key 31 at the key station 30, the key is plugged into the respective key receiver 33. After this, the key 31 can be turned, e.g., around an angle of 90°, until the head of the key 31 is exemplarily into a vertical position. In this position, the key 31 cannot be removed from the key receiver 33. To remove the key 31, the key has to be turned back, e.g., around −90°, before it can be pulled out.

Assuming that all keys 31 are currently stored in the respective key stations 30, if one of the keys 31 is turned in order to remove it, the second prevention means 23 automatically changes into the secure state. After this, further keys 31 can be removed from the key stations 30 which does not lead to a change of the secure state of the second prevention means 23. To leave the secure state of the second prevention means 23, all keys 31 have to be stored again in the key stations 30. In other words, only if the last of the missing keys 31 has been brought back to the key stations 30, the turning of this key 31 automatically closes the switches 24 of the second prevention means 23.

To change the current state of the second prevention means 23 when the key 31 is removed from or brought back to the key station 30, a, regarding the control unit 27, further control unit (not shown) is adapted to generate a respective control command. Alternatively, the control unit 27 can be adapted to generate this control command. In an embodiment, however, a mechanical coupling mechanism adapted to automatically change the second prevention means 23 into or leave it from the secure state when the key 31 is turned, is provided.

The control unit 27 is adapted to generate a control command changing the key stations 30 into a state generally allowing the removal of the keys 31, if the locking means 16 currently locks the rotatable mounted unit 3. Hence, if the rotatable mounted unit 3 is currently not locked, it is not possible to remove the keys 31 from the key stations 30. If the key stations 30 are in this state, signal lights 34 of the key stations 30 are green. Otherwise, the signal lights 34 are red or off.

Furthermore, the control unit 27 is adapted to generate a control command allowing the first prevention means 22 to leave the secure state only if all entrance means 13 are closed and locked. This control command can also be generated if the access condition is not fulfilled, i.e., if none of the keys 31 is removed from the key station 30. To detect whether the entrance means 13 are closed or locked, the control unit 27 is connected with the key boxes 32 and/or sensors (not shown) which are provided in the vicinity of the entrance means 13.

The locking system 2 comprises at least one pad-lock 35. If several technicians 12 are present at the wind turbine 1, each technician 12 has his own pad-lock 35. When entering the room 9, the respective technician 12 attaches his pad-lock 35 to the respective entrance means 13. This marks the door 14 to indicate that somebody is currently inside the room 9 and prevents the door 14 from being closed. The number of pad-locks 35 attached to the entrance means 13 indicates the number of technicians 12 who are currently within the room 9.

As shown in FIGS. 1 and 2, the technician 12 is currently working within the room 9 and has marked the door 14 with the pad-lock 35. Hence, it can be seen from the section 15 that somebody is currently inside of the room 9. Additionally, the pad-lock 35 physically prevents the door 14 from being closed and locked and, since the key 31 can only be removed from the key box 32 if the door is closed, the key 31 is prevented from being brought back to the key station 30. As a consequence, the second prevention means 23 cannot leave the secure state if the pad-lock 35 is attached to the door 14 and the technician 12 is inside the room 9.

In the following, details according to the method according to embodiments of the present invention are described on the basis of the FIGS. 1 and 2. To lock or engage the rotatable mounted units 3, the hub 4 has to be brought into a position where the pin 17 can engage into the hole 18. A turbine controller or, alternatively, the control unit 27 changes the locking means 16 into the locked state by activating the hydraulic drive 19. This can be triggered by the technician 12 via a control device (not shown) of the wind turbine 1. Alternatively, a respective signal can be generated from remote. After the locking means 16 has reached the locked state, the sensors 29 give a respective signal to the control unit 27.

Next, the control unit 27 generates the control command changing the first prevention means 22 into the secure state.

To open the switches 24 of the first prevention means 22, the control unit 27 generates a control command. Another control command generated by the control unit 27 changes the key station 30 into a state generally allowing it to remove the key 31. In addition, the signal light 34 turns from red or from the off-state into green colour. Next, one of the keys 31 is removed from the key station 30, e.g., by the technician 12, wherein the second prevention means 23 automatically changes into the secure state by opening the respective switches 24. The removed key 31 can now be inserted into the key box 32 of the entrance means 13 to unlock the entrance means 13. Next, the pad-lock 35 is attached to the door 14.

To unlock or retract the rotatable mounted units 3, all pad-locks 35 have to be removed from the entrance means 13 after all technicians 12 have left the room 9. Next, the entrance means 13 are locked by the keys 31 which are then stored in the respective key stations 30. While the last key 31 is turned into the vertical position, the second prevention means 23 automatically leaves the secure state, i.e., the respective switches 24 are closed. The key stations 30 provide a dual channel signal to the control unit 27 indicating that all entrance means 13 are closed and locked leading the control unit 27 to generate a control command which causes the first prevention means 22 to leave the secure state, i.e., to close the respective switches 24. Next the control unit generates a control command, e.g., to the turbine controller, which changes the locking means 16 into the unlocked state. After the locking means 16 has reached the unlocked state, the sensor 28 gives a respective signal to the control unit 27.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A locking system for a rotatable mounted unit of a wind turbine, comprising at least one lock configured to lock and unlock the rotatable mounted unit, wherein the locking system comprises a first device to prevent rotation and a second device to prevent rotation, wherein the at least one lock is prevented from changing from a locked state into an unlocked state if the first device to prevent rotation and/or the second device to prevent rotation is in a secure state, wherein a control unit is configured to generate a control command changing the first device to prevent rotation into the secure state when the at least one lock locks the rotatable mounted unit, and wherein the second device to prevent rotation is automatically changed into the secure state if an access condition is fulfilled, wherein the access condition is fulfilled if a recorded access information indicates that a room with the rotatable mounted unit is currently accessed or going to be accessed via an entrance, and wherein the first device to prevent rotation and/or the second device to prevent rotation includes switches configured to disconnect a power supply of at least one actuator of the at least one lock.

2. The locking system according to claim 1, wherein the at least one actuator is a valve of a hydraulic drive of the at least one lock or an electric motor.

3. The locking system according to claim 1, further comprising: a key station for storing a key to lock and unlock the entrance for the room, wherein the recorded access information depends on whether the key is currently stored in or at the key station, wherein the access condition is fulfilled if the key is removed from the key station.

4. The locking system according to claim 3, wherein the key station comprises a key receiver configured to hold or carry the key when the key is stored in or at the key station.

5. The locking system according to claim 4, wherein the key receiver is or comprises a key hole where the key is to be inserted for storage, wherein, for storing the key, the key is inserted into the key hole and turned and, for removing the key, the key is turned back before it can be pulled out, wherein turning the key back before removing the key changes the second device to prevent rotation into the secure state or leaves the second device to prevent rotation in the secure state.

6. The locking system according to claim 3, wherein a further control unit is configured to generate a control command changing the second device to prevent rotation into the secure state when the key is removed from the key station or in that the key station is coupled with the second device to prevent rotation by a coupling mechanism configured to change the second device to prevent rotation into the secure state when the key is removed from the key station.

7. The locking system according to claim 3, wherein the key station includes at least two key stations, each storing a key, wherein the locking system is configured to prevent rotation into the secure state if the key from at least one of the at least two key stations is removed.

8. The locking system according to claim 3, wherein the control unit or a further control unit is configured to generate a control command changing the key station into a state allowing the removal of the key from the key station, if the at least one lock currently locks the rotatable mounted unit.

9. The locking system according to claim 1, wherein the control unit is configured to generate a control command allowing the first device to prevent rotation to leave the secure state only if the entrance is closed and/or if the access condition is fulfilled.

10. The locking system according to claim 1, further comprising at least one padlock, wherein the at least one padlock can be attached to the entrance to mark the entrance and/or to prevent the entrance from being closed.

11. The locking system according to claim 1, wherein at least one pin or latch of the at least one lock engages into at least one recess or hole of the rotatable mounted unit for locking the rotatable mounted unit.

12. A wind turbine comprising a rotatable mounted unit, at least one entrance leading to a room with the rotatable mounted unit, and a locking system, wherein the locking system includes at least one lock configured to lock and unlock the rotatable mounted unit, a first device to prevent rotation, and a second device to prevent rotation, wherein the at least one lock is prevented from changing from a locked state into an unlocked state if the first device to prevent rotation and/or the second device to prevent rotation is in a secure state, wherein a control unit is configured to generate a control command changing the first device to prevent rotation into the secure state once the at least one lock locks the rotatable mounted unit, wherein the second device to prevent rotation into the secure state is automatically changed into the secure state if an access condition is fulfilled, wherein the access condition is fulfilled if a recorded access information indicates that the room with the rotatable mounted unit is currently accessed or going to be accessed via the at least one entrance, and wherein the first device to prevent rotation and/or the second device to prevent rotation includes switches configured to disconnect a power supply of at least one actuator of the at least one lock.

13. A method for locking a rotatable mounted unit of a wind turbine, comprising:

providing at least one lock configured to lock and unlock the rotatable mounted unit, a first device to prevent rotation, and a second device to prevent rotation, wherein the at least one lock is prevented from changing from a locked state into an unlocked state if the first device to prevent rotation and/or the second device to prevent rotation is in a secure state, wherein the first device to prevent rotation is changed into the secure state once the rotatable mounted unit is locked by the at least one lock, wherein the second device to prevent rotation automatically changes into the secure state if an access condition is fulfilled, wherein the access condition is fulfilled if a recorded access information indicates that a room with the rotatable mounted unit is currently accessed or going to be accessed via an entrance, and wherein the first device to prevent rotation and/or the second device to prevent rotation includes switches configured to disconnect a power supply of at least one actuator of the at least one lock.

14. A locking system for a rotatable mounted unit of a wind turbine, comprising at least one locking means configured to lock and unlock the rotatable mounted unit, wherein the locking system comprises a first prevention means and a second prevention means, wherein the at least one locking means is prevented from changing from a locked state into an unlocked state if at least one of the first prevention means and second prevention means is in a secure state, wherein a control unit is configured to generate a control command changing the first prevention means into the secure state once the rotatable mounted unit is locked by the at least one locking means, wherein the second prevention means automatically changes into the secure state if an access condition is fulfilled, wherein the access condition is fulfilled if a recorded access information indicates that a room with the rotatable mounted unit is currently accessed or going to be accessed via an entrance means, and wherein the first prevention means and/or the second prevention means includes switches configured to disconnect a power supply of at least one actuator of the at least one locking means.

* * * * *